(No Model.)
T. L. MONAGHAN.
WIND SCREEN FOR VEHICLES.
No. 567,860. Patented Sept. 15, 1896.
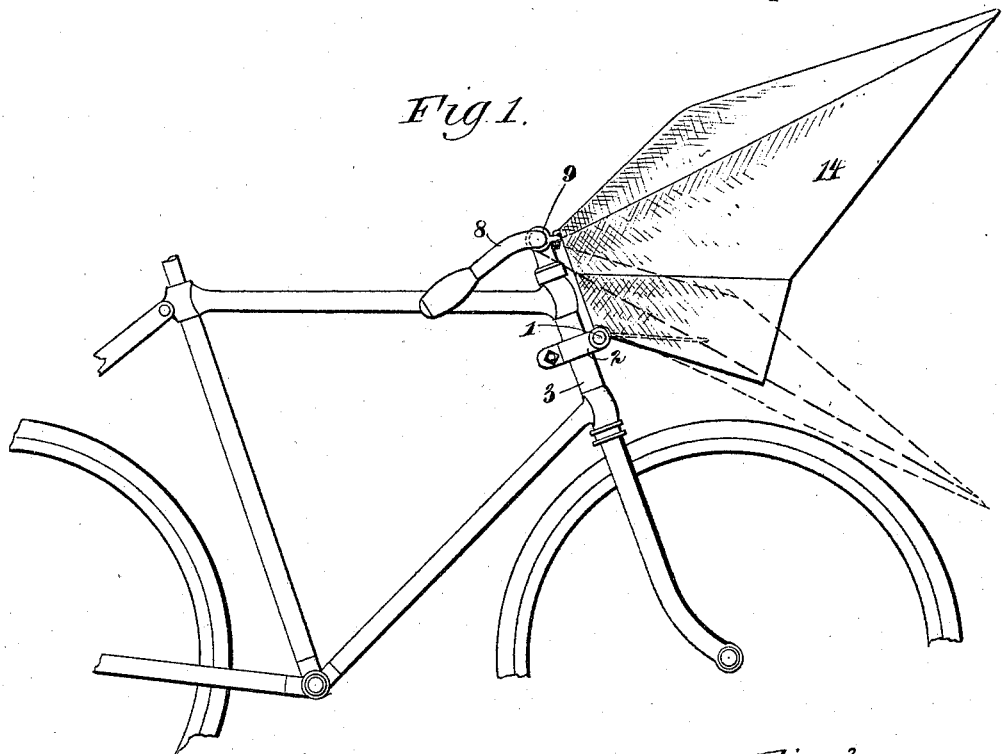
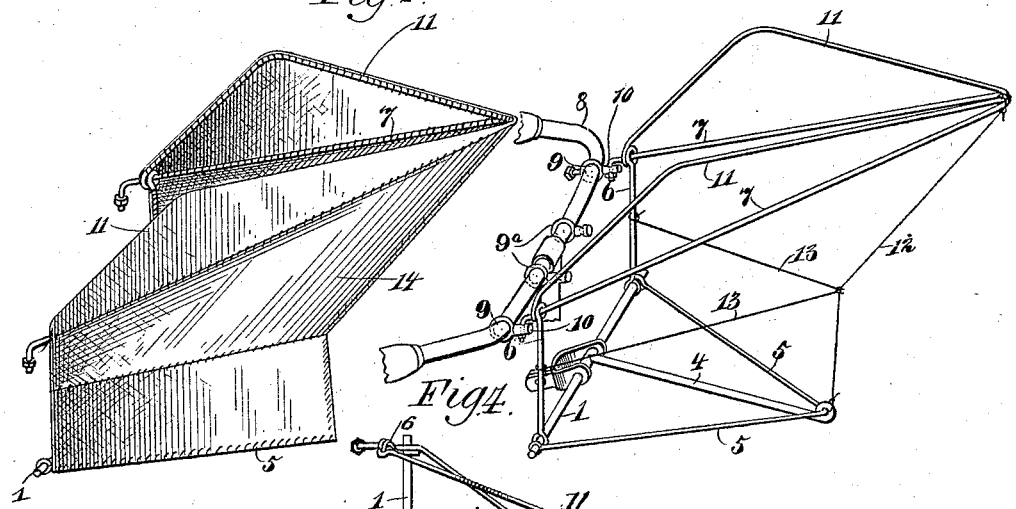
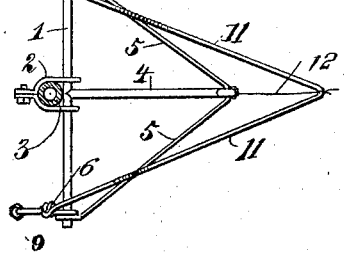
WITNESSES:
INVENTOR
T. L. Monaghan
BY
ATTORNEYS.

UNITED STATES PATENT OFFICE.

THOMAS L. MONAGHAN, OF NEW YORK, N. Y.

WIND-SCREEN FOR VEHICLES.

SPECIFICATION forming part of Letters Patent No. 567,860, dated September 15, 1896.

Application filed May 2, 1896. Serial No. 589,986. (No model.)

*To all whom it may concern:*

Be it known that I, THOMAS L. MONAGHAN, of New York city, in the county and State of New York, have invented certain new and useful Improvements in Wind-Screens for Vehicles, of which the following is a full, clear, and exact description.

This invention relates more particularly to wind-screens for bicycles; and the object is to provide a simple and light device that may be easily attached to a bicycle in such position as to shield the rider from the force of a head wind, and also so constructed as to divide or cut the wind, thus reducing the resistance.

I will describe a wind-screen embodying my invention, and then point out the novel features in the appended claim.

Reference is to be had to the accompanying drawings, forming a part of this specification, in which similar characters of reference indicate corresponding parts in all the figures.

Figure 1 is a side elevation of a wind-screen embodying my invention and showing the same as applied to a bicycle. Fig. 2 is a perspective view thereof. Fig. 3 is a perspective view of a frame for the screen, and Fig. 4 is a top plan view thereof.

The invention comprises a frame made of suitable wire and as light as it can be conveniently made and insure the necessary strength. The frame has a cross-bar 1, designed to be attached to a portion of the bicycle-frame in such manner as to swing axially thereof. As here shown, this bar 1 is mounted to swing in a clip 2, designed to engage loosely around the steering-head tube 3 of a bicycle-frame. From the center of the bar 1 an arm 4 extends forward, and at its outer end this arm is provided with an eye, through which a bottom brace 5 extends. The opposite side portions of this bottom brace diverge rearwardly and engage loosely at the ends with the ends of the cross-bar 1. Standard-wires 6 have eyes formed at their lower ends to engage around the bar 1 near its ends, and the upper ends of these standard-wires are provided with eyes which engage loosely over the upper brace-wires 7, which extend forward substantially to a point. The ends of the upper brace 7 are designed to be engaged with the bicycle handle-bar 8 at opposite sides of the steering-head. The handle-bar 8 is provided with bands 9, having forwardly-extending fingers 10, which are perforated to receive the downwardly-turned ends of the braces. When it is desired to fold the screen, the brace ends may be transferred to engagement with bands $9^a$, similar to the bands 9, but nearer to the steering-head.

Top stay-wires 11 have their ends turned around the wires 7, rearward of the uprights 6, and from this point the top stays extend upward and forward and then downward and forward to a point or apex loosely connected with the apex of the top brace-wire 7. A flexible connection, such as a cord 12, extends from the apex of the top brace-wires to the apex of the bottom brace-wires, and a flexible connection or cord 13 has its ends connected to the uprights 6 and passes around the cord 12. The cord 13 is of a length to draw the cord 12 inward to form a short vertical lower portion and a forwardly and upwardly inclined upper portion. It will be observed that the upper brace-wires extend beyond a vertical line from the apex of the lower brace-wires, and that when the screen is in position its upper forward end will be considerably above the horizontal plane of the handle-bar, and thus a chamber is formed in which a rider, by stooping, may place his head, and obviously the screen will deflect the wind laterally of the rider's body.

Attached to the frame is a screen-covering 14, of textile material, preferably of light transparent silk or silk rendered transparent by oil or similar material, so that a rider may see through the same.

Obviously this invention will be of great service in fast riding against strong winds. When not required as a shield, the device may be folded together, as indicated in dotted lines in Fig. 1.

It is obvious that the lower cross-bar 1 of the frame may be rigidly attached to the steering-head spindle instead of to the front tube of the bicycle-frame, as shown.

The collars 9 may be attached to rotate on the handle-bar, so that the fingers 10 may be adjusted to more or less angle to throw the outer end of the screen more or less down or up. The collars may be held as adjusted by set-screws.

Having thus fully described my invention, I claim as new and desire to secure by Letters Patent—

A wind-screen for a bicycle, comprising a cross-bar adapted for swinging engagement with the steering-head tube of a bicycle-frame, uprights extended therefrom, top brace-rods extended from the upper ends of the uprights and converging forwardly, bottom brace-rods extended from the cross-bar and converging forwardly, the top stays, the flexible or cord connections, and a covering of textile material substantially as specified.

THOMAS L. MONAGHAN.

Witnesses:
JNO. M. RITTER,
F. W. HANAFORD.